US011259088B2

(12) United States Patent
Zimmerman

(10) Patent No.: US 11,259,088 B2
(45) Date of Patent: Feb. 22, 2022

(54) PREVIEWING A VIDEO IN RESPONSE TO COMPUTING DEVICE INTERACTION

(71) Applicant: Google LLC, Mountain View, CA (US)

(72) Inventor: Jared Michael Zimmerman, San Mateo, CA (US)

(73) Assignee: Google LLC, Mountain View, CA (US)

( * ) Notice: Subject to any disclaimer, the term of this patent is extended or adjusted under 35 U.S.C. 154(b) by 340 days.

(21) Appl. No.: 15/796,681

(22) Filed: Oct. 27, 2017

(65) Prior Publication Data

US 2019/0132648 A1 May 2, 2019

(51) Int. Cl.
*H04N 21/472* (2011.01)
*H04N 21/8549* (2011.01)
(Continued)

(52) U.S. Cl.
CPC ..... *H04N 21/47202* (2013.01); *G06F 3/0485* (2013.01); *G06F 3/0488* (2013.01);
(Continued)

(58) Field of Classification Search
CPC ........... H04N 21/47202; H04N 21/422; H04N 21/4316; H04N 21/4325; H04N 21/8549;
(Continued)

(56) References Cited

U.S. PATENT DOCUMENTS 5,956,026 A * 9/1999 Ratakonda ........... G11B 27/102
715/723

6,268,864 B1 * 7/2001 Chen ....................... G06T 13/80
345/428
(Continued)

FOREIGN PATENT DOCUMENTS

| EP | 3094098 | 11/2016 |
|---|---|---|
| KR | 10-2017-0029933 | 3/2014 |
| KR | 10-2014-0111088 | 9/2014 |

OTHER PUBLICATIONS

Create Short Preview from Video. Blog [online], David Walsh, Mar. 8, 2017 [Retrieved on Jun. 4, 2021] Retrieved from the Internet: < URL: https://davidwalsh.name/video-preview> (Year: 2017).*
(Continued)

*Primary Examiner* — David S Posigian
(74) *Attorney, Agent, or Firm* — Dority & Manning, P.A.

(57) ABSTRACT

In general, the subject matter described in this disclosure can be embodied in describes methods, systems, and other mechanisms for previewing a video in response to computing device interaction. The method includes presenting, on a display of a computing device, a graphical indication of a video; identifying, by the computing device, that first user input interacted with the computing device; presenting, by the computing device, an animation of a preview of the video in response to the computing device having identified that the first user input interacted with the computing device; identifying, by the computing device, that the first user input stopped interacting with the computing device; stopping, by the computing device, the animation of the preview of the video in response to the computing device having identified that the first user input stopped interacting with the computing device.

16 Claims, 8 Drawing Sheets

(51) Int. Cl.
   *H04N 21/432* (2011.01)
   *G06F 3/0485* (2013.01)
   *G06F 3/0488* (2013.01)
   *H04N 21/431* (2011.01)

(52) U.S. Cl.
   CPC ..... *H04N 21/4316* (2013.01); *H04N 21/4325* (2013.01); *H04N 21/472* (2013.01); *H04N 21/47217* (2013.01); *H04N 21/8549* (2013.01)

(58) Field of Classification Search
   CPC ......... H04N 21/4396; H04N 21/44213; H04N 21/472; H04N 21/47217; H04N 21/8455; G06F 1/1694; G06F 3/0485; G06F 3/04855; G06F 3/0487; G06F 3/0488; G06F 16/739; G06K 9/00711; G06K 9/00744
   See application file for complete search history.

(56) References Cited

U.S. PATENT DOCUMENTS

| | | | | |
|---|---|---|---|---|
| 8,407,575 | B1* | 3/2013 | Goldman | G06F 16/739 715/204 |
| 2002/0054074 | A1* | 5/2002 | Sugano | G06F 16/54 715/730 |
| 2002/0178453 | A1* | 11/2002 | Jun | H04N 5/9262 725/88 |
| 2003/0014415 | A1 | 1/2003 | Weiss et al. | |
| 2003/0210886 | A1* | 11/2003 | Li | G06F 16/739 386/241 |
| 2004/0095396 | A1* | 5/2004 | Stavely | G06F 3/04817 715/838 |
| 2004/0150657 | A1* | 8/2004 | Wittenburg | G06F 3/0485 345/619 |
| 2004/0221322 | A1* | 11/2004 | Shen | G11B 27/28 725/135 |
| 2007/0266322 | A1* | 11/2007 | Tretter | G11B 27/105 715/716 |
| 2008/0034306 | A1* | 2/2008 | Ording | G06F 3/04817 715/764 |
| 2008/0225153 | A1* | 9/2008 | Fagans | G06F 3/0481 348/333.01 |
| 2009/0079840 | A1* | 3/2009 | Gandhi | G11B 27/28 348/222.1 |
| 2009/0172543 | A1 | 7/2009 | Cronin et al. | |
| 2009/0307571 | A1 | 12/2009 | Gowda et al. | |
| 2010/0070523 | A1* | 3/2010 | Delgo | G11B 27/34 707/769 |
| 2010/0111498 | A1* | 5/2010 | Weda | G11B 27/28 386/241 |
| 2012/0011464 | A1 | 1/2012 | Hayashi et al. | |
| 2012/0036485 | A1 | 2/2012 | Watkins, Jr. et al. | |
| 2012/0042246 | A1 | 2/2012 | Schwesinger et al. | |
| 2014/0023348 | A1* | 1/2014 | O'Kelly | G11B 27/031 386/278 |
| 2014/0289629 | A1 | 9/2014 | Rossmann et al. | |
| 2014/0365890 | A1* | 12/2014 | Lei | H04N 21/4143 715/719 |
| 2014/0365892 | A1 | 12/2014 | Jiang et al. | |
| 2015/0153910 | A1* | 6/2015 | Wheeler | G06F 3/0482 715/719 |
| 2015/0212702 | A1 | 7/2015 | Kim et al. | |
| 2017/0068397 | A1* | 3/2017 | Shoemaker | G06F 3/0482 |

OTHER PUBLICATIONS

Screen captures from YouTube video clip entitled "YouTube Playback While Scrolling," x pages, uploaded on Sep. 28, 2015 by user "Android Police". Retrieved from Internet: <https://www.youtube.com/watch?v=72MrZ7463Vs> (Year: 2015).*
PCT International Preliminary Report on Patentability in International Application No. PCT/US2018/045390, dated Sep. 9, 2019, 8 pages.
PCT International Preliminary Report on Patentability in International Application No. PCT/US2018/045390, dated Jan. 16, 2020, 10 pages.
PCT Invitation to Pay Additional Fees and, Where Applicable, Protest Fee, issued in International Application No. PCT/US2018/045390, dated Nov. 7, 2018, 12 pages.
PCT International Search Report and Written Opinion issued in International Application No. PCT/US2018/045390, dated Jan. 10, 2019, 18 pages.
'terrymun.github.io' [online] "Replicating the photo viewer/panner seen on the experimental Facebook Pages app," Aug. 15, 2015 [retrieved on Oct. 4, 2017] Retrieved from Internet: URL<http://terrymun.github.io/paver/demo/index.html> 13 pages.
'www.displaymate.com' [online] "iPhone 7 Display Technology Shoot-Out: Viewing Angles," available on or before Sep. 20, 2016, [retrieved on Jan. 19, 2018] Retrieved from Internet URL<http://www.displaymate.com/iPhone7_ShootOut_1.htm#Viewing_Angles> via the Wayback Internet Archive at URL<https://web.archive.org/web/20160920041019/http://www.displaymate.com/iPhone7_ShootOut_1.htm> 9 pages.
'www.polaroidswing.com' [online] "Swng: Microsoft Announcement," first available on or before Oct. 1, 2016, [retrieved on Oct. 19, 2018] Retrieved from Internet URL<https://www.polaroidswing.com/ > via the Wayback Internet Archive at Internet URL<https://player.vimeo.com/video/174231139/fallback?noscript>, 6 pages.
'www.thepetedesign.com' [online] "JQuery Panorama Viewer,"Mar. 5, 2016 [retrieved on Oct. 4, 2017] Retrieved From Internet: URL<http://www.thepetedesign.com/demos/panorama_viewer_demo.html> 3 pages.
Ashish, "How to Shoot and Upload Photos in 360 Degrees on Facebook Using Your Smartphone," Guiding Tech, Jul. 16, 2016 [retrieved on Aug. 26, 2016], Retrieved from the Internet: URL<http://www.guidingtech.com/60166/360-degree-photos-facebook/> 10 pages.
Huang, "Introducing 360 Photos on Facebook," Facebook Newsroom, Jun. 9, 2016 [retrieved on Aug. 26, 2016], Retrieved from the Internet: URL<http://newsroom.fb.com/news/2016/06/introducing-360-photos-on-facebook/>, 4 pages.
International Search Report and Written Opinion in International Application No. PCT/US2017/045062, dated Oct. 2, 2017, 8 pages.
KR Office Action in Korean Application No. 10-2019-7034135, dated Aug. 26, 2020, 13 pages (with English translation).

* cited by examiner

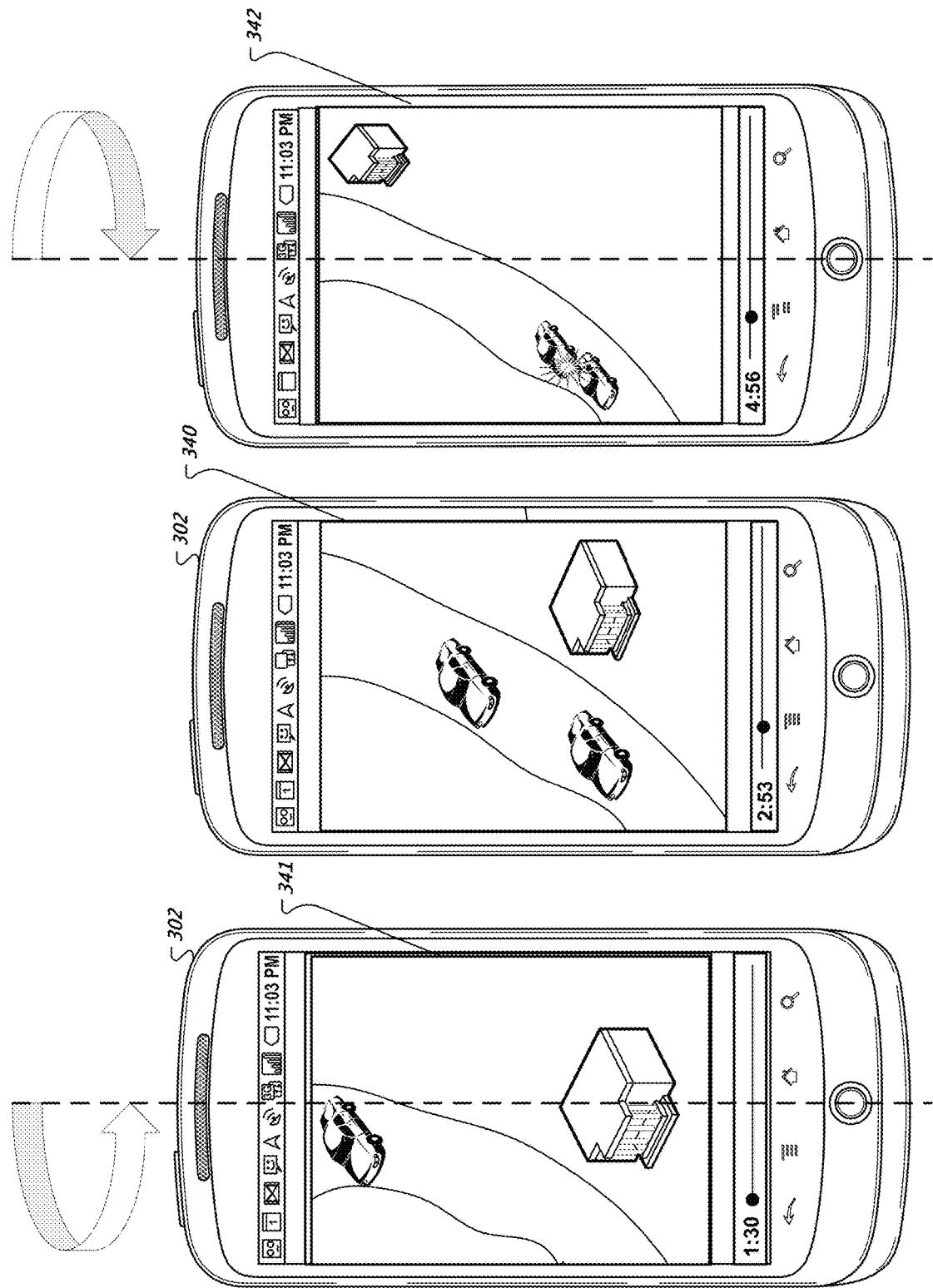

PREVIEWING A VIDEO IN RESPONSE TO COMPUTING DEVICE INTERACTION

BACKGROUND

Computing devices are often capable of playing video within a portion of the display or by filling the entire display. The video may play in response to user input that selects the video, for example, by clicking on a representation of the video. For example, the user interface of a computing device may include a box that presents a single frame from the video with a "Play" symbol interposed over the single frame of the video. Tapping or clicking within the box may cause the video to begin playing, starting with a beginning frame of the video.

SUMMARY

This document describes techniques, methods, systems, and other mechanisms for previewing a video in response to computing device interaction. The preview may not occur without computing device interaction, and therefore may only inform users of video content when a user is or has engaged with the computing device. As an illustration, a user may be using a computing device such as a smartphone or laptop to surf the Internet or scroll through social network posts. The user may open a page or scroll down a page to a location at which a graphical indication of a video is presented. This graphical indication of the video may include a box that shows a single frame of the video and/or a play button, to indicate that the graphical item represents a video that can be played.

Aside from the single frame of the video or text that may accompany the graphical indication, the user may have limited knowledge of the contents of the video. If the user is intrigued, he or she may provide user input to play the video, and may move a slider element forward to view different portions of the video. Such interactions suffer from various drawbacks. For instance, selecting the video and then moving the slider element requires multiple user interactions with specific elements of the user interface, and may involve a reasonable amount of the user's time. Moreover, the user must be interested enough to select the video in the first place, which will not always be the case. In fact, the user may have a great interest in the topic covered by the video, but the user may not know so unless he or she plays the video.

Another option is for a computing device to automatically play a video, but such automated playing can be intrusive. For instance, a user reading text that is presented by the computing device may be distracted by a video that is playing off to the side. Further, a user may not want sound that accompanies many videos to play without the user providing input that specifically initiates sound production.

Such downsides can be avoided with a system that presents a preview of a video in response to user interaction with a computing device, but limits the presentation to moments when the user interacts with the computing device. As such, the preview may stop when user input also ceases (e.g., immediately or after a specified amount of time, such as 0.1, 0.3, 0.5, or 1.0 seconds). The preview may present without sound, so that even when the preview plays it is not unduly intrusive.

Various types of user interaction with the computing device may trigger presentation of the preview, such as physically moving the computing device (as determined by one or more sensors in the computing device), pressing a physical button of the computing device, or interacting with a touchscreen of the computing device. As described above, the preview may stop once the user interaction stops. For example, the preview may only play as long as the user is physically moving the computing device (e.g., by rotating or translating the computing device). In other examples, the preview may only play as long as the user is manipulating physical user input elements of the computing device (e.g., by typing, changing the volume, or moving the mouse). In even further examples, the preview may only play as long as the user is interacting with a touchscreen of the computing device (e.g., touching a portion of the touchscreen at a location that is unrelated to the video, or by scrolling the user interface).

This disclosure refers to the preview at times as an animation. This is because the preview includes the playing of multiple frames from the video, but the frames may not be played at a same frame rate as the video may play. Indeed, the animation may exclude frames from the corresponding portion of the video. For example, while one second of the video may include 24 frames, the preview may comprise frames from a three-second portion of the video, but may only include every third frame, such that the entire preview includes 24 total frames rather than the 72 frames from the corresponding portion of the video. As such, the preview may exclude some intervening frames to minimize the storage and transmission file size of the preview, for example, because a high frame rate to achieve smooth video playback may be unnecessary in such a preview.

Moreover, the selected frames may not be selected from a single portion of the video. For example, the preview may include some frames that show an animated fight scene from the video, some frames that shown an animated travel scene from the video, and some frames that show an animated horror scene from the video. As such, the preview of the video may portray different parts of the video. As such, the preview may not start with a beginning frame of the video, which is how the video may play in response to user input that plays the actual video.

The one or more portions of the video that comprise the preview may be determined in various manners. In some examples, an automated system analyzes the playback of the video by various users to identify those portions of the video that are commonly repeated or linked. The automated system can also determine one or more portions of a video at which significant motion appears, and one or more portions that are repeated (e.g., in slow motion), as just a couple examples. These determined portions may be automatically selected by a computing system to be relevant (e.g., salient) portions of the video, and may be designated as the portions of the video to include in a preview.

In some examples, an individual affiliated with creating or distributing the video may select salient portions of the video to show in the preview. As such, a user interface at a computing system may allow such an individual to select a starting time and an ending time for each of one or more portions of the video, and select a number of frames to be selected from each of the one or more portions of the video (e.g., 24 fps, 10 fps, or 5 fps). The individual may also select individual frames to include in the preview.

In some implementations, the timing at which frames of the preview are played back is not set by a clock speed (e.g., 10 fps), but varies based on specifics of user interaction with the computing device. For example, the frames of the preview may correspond to user interface scrolling positions. For instance, as a user scrolls down a page (e.g., using their finger on a touchscreen or using a mouse), an indication of a video may appear from the bottom edge of the display and may start playing once that indication of the video is a certain number of pixels or a certain percentage into the display (e.g., to give the video a chance to enter the display before it begins playing). At that point, as the user continues to scroll downward, the video may animate through its preview. Should the user stop scrolling, the preview may stop. Should the user scroll back upwards, the preview may play in reverse as it moves back up the screen. Accordingly, every position of the preview in the user interface may correspond to a particular frame in the preview.

In some examples, the number of frames in the preview is determined based on a screen size or a screen resolution of the computing device. This may be to ensure that the start and end to the preview may correspond to the preview being located at the bottom and top of the display, respectively. For instance, a tablet with a relative-large, high-resolution screen may be able to play several dozen or hundred frames of a preview as a user scrolls the preview from the bottom of the display to the top. On the other hand, a phone with a small, low-resolution screen may have fewer "positions" at which to play the video, and therefore may decimate (e.g., remove) more frames from the corresponding portion of the video. This decimation may be performed by the computing device or by a remote computing system that sends the preview to the computing device and that has access to the computing device's characteristics.

In another example of the timing of preview playback being based on the specifics of user interactions with the computing device, the frames of the preview may correspond to device physical orientations. For example, the device may be able to determine how it is oriented using one or more of accelerometers and gyroscopes of the computing device. Different physical orientations may correspond to different frames of the preview, such that as a user rotates their phone the preview may animate. As with the above-described scrolling example, a user may play the preview forward and backwards by rotating the phone back and forth. The types of rotation can include rotating left-to-right and up-and-down, as just two examples. Preview playback can also correspond to translational movement, such as moving a phone toward and away from a user, or from side-to-side.

In such examples, the correspondence of physical orientation/movement to frames may be a relative correspondence or an absolute correspondence. In an absolute correspondence, a phone held at 5 degrees may correspond to a particular frame of the preview regardless how the phone was positioned when the preview started playing. In other words, the frame first played by the preview was the frame that corresponded to the phone position at that time. In relative correspondence, a phone would start playing the first frame in the preview when the appropriate page loaded or the preview appeared on the display, despite the angle or position of the phone. The angle or position of the phone when the preview started would serve as the "zero" position of the phone and positive angular movement, for example, would cause forward playback of the preview and negative angular movement would cause backwards playback of the preview.

Playing a preview differs from the playing of the actual video in various manners. First, as described above, playing a preview may be limited to a subset of the frames from the actual video and the framerate may differ from that of the actual video. Second, the video may continue playing even without user interaction with the device (as long as a user had previously started playing the video). Moreover, playing the video may occur in response to a user clicking on a representation of the video or a user interface element associated therewith, while playing of the preview may occur despite a user having not selected a representation of the video or a user interface element associated therewith. Rather, the preview may animate simply in response to a user moving their computing device or scrolling down a page.

Embodiment 1 is a method. The method includes presenting, on a display of a computing device, a graphical indication of a video. The method includes identifying, by the computing device that first user input interacted with the computing device. The method includes presenting, by the computing device, an animation of a preview of the video in response to the computing device having identified that the first user input interacted with the computing device. The method includes identifying, by the computing device, that the first user input stopped interacting with the computing device. The method includes stopping, by the computing device, the animation of the preview of the video in response to the computing device having identified that the first user input stopped interacting with the computing device. The method includes identifying, by the computing device, that second user input selected the graphical indication of the video. The method includes playing, by the computing device, the video as a result of having identified that the second user input selected the graphical indication of the video.

Embodiment 2 is the method of embodiment 1, wherein the graphical indication of the video includes a play button.

Embodiment 3 is the method of embodiment 2, wherein identifying that the second user input selected the graphical indication of the video includes identifying that the second user input selected the play button.

Embodiment 4 is the method of embodiment 1, wherein the first user input does not include user selection of the graphical indication of the video.

Embodiment 5 is the method of embodiment 1, wherein: the video includes a collection of frames in a sequential order; the collection of frames includes a first frame, a second frame, and a third frame, with the second frame occurring in the sequential order between the first and third frame; playing the video includes playing the collection of frames in the sequential order; the preview of the video includes a subset of frames from the collection of frames; the preview of the video excludes intervening frames, such that the preview of the video includes the first frame and the third frame but excludes the second frame; and presenting the animation of the preview of the video includes playing the subset of frames, including the first frame and the third frame, but excluding the second frame.

Embodiment 6 is the method of embodiment 1, wherein: the video includes a collection of frames; playing the video includes starting the playing of the video with a beginning frame from the collection of frames; the preview of the video includes a subset of frames from the collection of frames; and presenting the animation of the preview of the video includes starting the animation of the preview of the video with a frame that is not the beginning frame from the collection of frames.

Embodiment 7 is the method of embodiment 1, wherein identifying that the first user input interacted with the computing device includes identifying that the computing device physically moved due to information received from an accelerometer or gyroscope of the computing device.

Embodiment 8 is the method of embodiment 7, wherein presenting the animation of the preview of the video includes: identifying that the computing device has a first physical orientation using information received from the accelerometer or gyroscope of the computing device; identifying a frame of the preview that corresponds to the first physical orientation; presenting the frame of the preview that corresponds to the first physical orientation as a result of having identified that the computing device has the first physical orientation; identifying that the computing device has a second physical orientation using information received from the accelerometer or gyroscope of the computing device; identifying a frame of the preview that corresponds to the second physical orientation; and presenting the frame of the preview that corresponds to the second physical orientation as a result of having identified that the computing device has the second physical orientation.

Embodiment 9 is the method of embodiment 7, wherein presenting the animation of the preview of the video includes: presenting frames of the preview in a forward progression in response to determining that the computing device is physically moving in a first manner; presenting frames of the preview in a backwards progression in response to determining that the computing device is physically moving in a second manner; and the second manner is opposite the first manner.

Embodiment 10 is the method of embodiment 9, wherein: the first manner includes rotating the computing device in a first direction and the second manner includes rotating in a second direction that is opposite the first direction; or the first manner includes translating the position of the computing device in a third direction and the second manner includes translating the position of the computing device in a fourth direction that is opposite the third direction.

Embodiment 11 is the method of embodiment 1, wherein identifying that the first user input interacted with the computing device includes identifying that user input contacted a touchscreen of the computing device at a location other than the presentation of the graphical indication of the video.

Embodiment 12 is the method of embodiment 1, wherein identifying that the first user input interacted with the computing device includes identifying that user input scrolled a user interface that is being presented by the display of the computing device.

Embodiment 13 is the method of embodiment 12, wherein presenting the animation of the preview of the video includes: identifying that the user interface is scrolled to a first position; identifying a frame of the preview that corresponds to the first position; presenting the frame of the preview that corresponds to the first position as a result of having identified that the user interface is scrolled to the first position; identifying that the computing device is scrolled to a second position; identifying a frame of the preview that corresponds to the second position; and presenting the frame of the preview that corresponds to the second position as a result of having identified that the user interface is scrolled to the second position.

Embodiment 14 is the method of embodiment 12, wherein presenting the animation of the preview of the video includes: presenting frames of the preview in a forward progression in response to determining that user input is scrolling the user interface in a first direction; and presenting frames of the preview in a backwards progression in response to determining that user input is scrolling the user interface in a second direction that is opposite the first direction.

Embodiment 15 is the method of embodiment 12, wherein: the video includes a collection of frames; and the preview of the video includes a subset of frames from the collection of frames; the method further comprises selecting the subset of frames from the collection of frames based on a size or resolution of the display of the computing device.

Embodiment 16 is the method of embodiment 1, wherein: the video comprises a collection of frames; and the preview of the video includes a subset of frames selected from a collection of frames; the method further comprises selecting the subset of frames from the sub-collection of frames based on the computing device determining that the subset of frames is associated with the salient portion of the video.

Embodiment 17 is the method of embodiment 16, wherein selecting the subset of frames includes: selecting a starting time and an ending time; and selecting the subset of frames from times of the video between the starting time and the ending time.

Embodiment 18 is the method of embodiment 16, wherein selecting the subset of frames includes: selecting a number of frames; and selecting the subset of frames to include the selected number of frames.

Embodiment 19 is the method of embodiment 1, wherein: the video includes a collection of frames; and the preview of the video includes a subset of frames selected from two salient portions of the video without including frames from a portion of the video between the two salient portions of the video; the method further comprises selecting the subset of frames based on determining that the subset of frames are from two salient portions of the video.

Embodiment 20 is a system. The system includes one or more processors. The system includes one or more computer-readable devices including instructions that, when executed by the one or more processors, cause the system to perform operations that comprise: presenting, on a display of a computing device, a graphical indication of a video; identifying, by the computing device, that first user input interacted with the computing device; presenting, by the computing device, an animation of a preview of the video in response to the computing device having identified that the first user input interacted with the computing device; identifying, by the computing device, that the first user input stopped interacting with the computing device; stopping, by the computing device, the animation of the preview of the video in response to the computing device having identified that the first user input stopped interacting with the computing device; identifying, by the computing device, that second user input selected the graphical indication of the video; and playing, by the computing device, the video as a result of having identified that the second user input selected the graphical indication of the video.

The details of one or more implementations are set forth in the accompanying drawings and the description below. Other features, objects, and advantages will be apparent from the description and drawings, and from the claims.

DESCRIPTION OF DRAWINGS

FIGS. 3A-C show a computing device for animating a preview of a video, in response to a user physically moving the computing device by rotating the computing device.

Like reference symbols in the various drawings indicate like elements.

DETAILED DESCRIPTION

This document generally describes previewing a video in response to computing device interaction.

Figure 1:
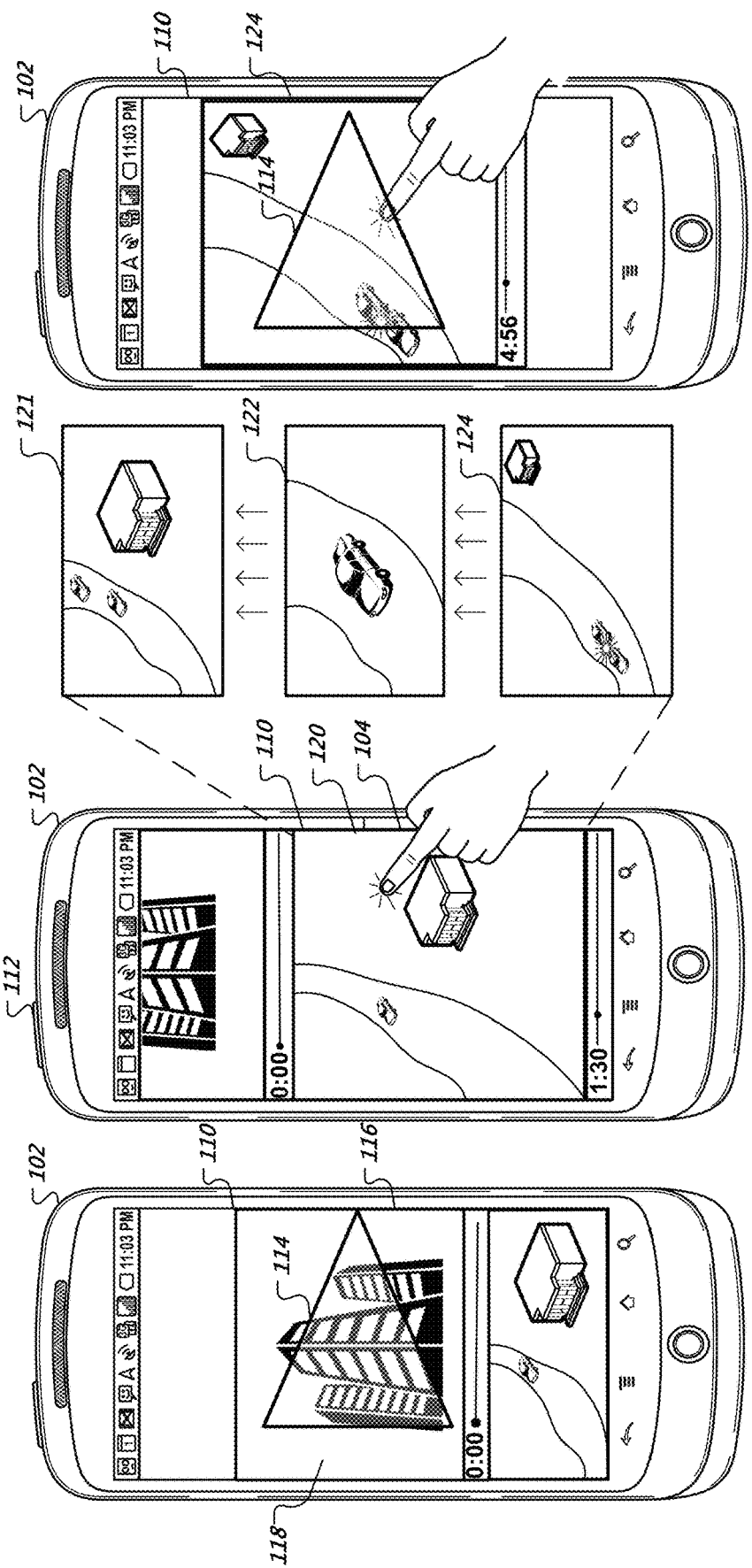
FIGS. 1A-C show multiple views of a computing device that, when interacted with by a user, animates a preview of a video that includes portions of a longer video.

FIGS. 1A-C show multiple views of a computing device 102 that, when user input interacts therewith, animates a preview of a video that includes portions of a longer video. In FIGS. 1A-C the computing device 102 is depicted as a handheld mobile telephone (e.g., a smartphone, or an application telephone). In referring to FIG. 1A, the computing device 102 presents a graphical indication 116 of a video on display 110. The graphical indication 116 visually notifies a user that a video is available to play on the computing device 102.

As an example, a user can open an application installed on computing device 102, for instance a mobile web browser or mobile application (e.g., an app), to access multimedia content. In many cases, vast amounts of multimedia content can be presented to a user by the computing device 102, as online content is made available by various content providers that are accessible via a network, such as the Internet. In an example scenario, a user can interact with a touchscreen of computing device 102 to scroll through different multimedia content, such as displayed images, graphics, interactive links, audio, and text. For instance, images can be included in posts presented within a social media app. Multimedia content, in some cases, can indicate to a user that additional content is available to be retrieved. The additional content can be made accessible to a user, in some cases, by further engaging with the computer device 102, for example by selecting a link to download or stream an audio file. In continuing with the example, the graphical indication 116 illustrated in FIG. 1A can be displayed by the computing device 102 as a result of a user scrolling within a social media app to a presentation of a post that includes a video from an online source.

In some cases, the content provider, or website, presents a stock indicator for video that allows a user to easily tell that that the available multimedia content is indeed a video. The indicator, however, may not be prominent. Thus, as the user is unaware of the video content, the user may not interact with the computing device 102 to play the video (even though the user may be interested in the contents of the video). In another case, the content provider may initially present a stock indicator for the video which does not depict images that are most relevant to the contents of the video. As such, images that may be of most interest to the user may not be initially displayed in the indicator for the video.

The mechanisms described herein can present a graphical indication 116 that is adapted for a video preview. For instance, the graphical indication 116 can include an image 118 and a graphic that is automatically selected by the system. As an example, the computing device 102 can integrate an automated feature that, upon recognizing that a file is a video, such as encountering a file having a MP4 extension, selects a frame or still image of the video that may have a higher likelihood of attracting the user's interest. Additionally, the system can select a graphic having attributes such as size, color, shape, that makes the graphical indication 116 more visually distinct from other multimedia content. Selecting the image 118 can include the computing device 102 identifying salient portions of the video due to those portions of the video having imagery that is determined by the system (or an individual affiliated with creating or distributing the video) to have high relevancy. For purposes of discussion, relevant features may be those that suggest a genre or a subject that is characteristic of the contents of the video. As example, the image 118 included in graphic 116 can be a frame from a portion of the video that is determined most relevant, or most viewed. In another example, the image 118 can be a selected frame that corresponds to an initial calibrating physical orientation, or zero position, for the computing device 102 as it further relates to preview animation aspects of the invention.

A video, and the preview of the video, can be implemented using digital video files that are collections of images, audio and other data. In dealing with video, large amounts of data can be required to depict a video signal accurately. Accordingly, files used by the system for formatting videos and previews, can be compressed and stored into a container file. Video files can be generally described as being formatted to comprise: a container type (e.g., AVI, MOV, Quicktime, WMV, MP4); a video and audio signal; and a codec (e.g., H.264, MPEG-4), which is the software used for encoding/decoding the video signal. Video files also have attributes, or characteristics, such as frame size, aspect ratio, frame rate, bitrate, and audio sample rate.

FIG. 1A illustrates the graphical indication 116 as a box showing an image 118 relating to the video, and including a play button 114. The image 118 can be an image or graphic formatted as an image file (e.g., JPG, TIF, PNG, or GIF) that can be supported by the computing device 102. The image 118 of the graphical indication 116 may depict imagery representative of the contents of the video. For example, an image showing a dog can be included in the graphical indication 116 to indicate a video clip of pets.

In some cases, the image 118 can be an image that also includes text, for instance displaying a title of a movie within the graphical indication 116. Also, the image 118 can be a single frame, or static image, taken from the video. In some cases, image 118 is the first frame in a sequence of a collection of frames included in the video. FIG. 1A shows image 118 depicting a building. For example, the building in image 118 can be the beginning frame of a video clip. Alternatively, image 118 may not show the first frame of the sequence, but another frame within the collection of frames in the video.

In some instances, the computing device 102 supplements displaying the graphical indication 116 with other non-graphical indications, such as an audio or tactile alert (e.g., vibrate), to further direct the attention of the user to the available video. For example, upon displaying the graphical notification 116, the computing device 102 can output an audible beep, to notify the user that the graphical indication 116 represents a video that can be played. Accordingly, computing device 102 may include visual, tactile, and auditory output components (e.g., LED lights, a vibrating mechanism for tactile output, or a speaker for providing tonal, voice-generated, or recorded output), as may various different input components (e.g., keyboard, physical buttons, trackballs, accelerometers, gyroscopes, and magnetometers).

Additionally, the graphical indication 116 can prompt a user to interact, or to otherwise engage, with the computing device 102. For instance, in situations in which a user is seemingly interested in image 118, a user may be more likely viewing the preview of the video, or the video itself.

FIG. 1B shows another view of the computing device 102 presented after a user has interacted with the graphical indication 116 (shown in FIG. 1A). As an example, the user interacts with the display 110 of computing device 102, which is illustrated as a touchscreen. In FIG. 1B, the computing device 102 is depicted as including a touchscreen display 110 for presenting a preview of a video 104, including an animation of the preview of the video 108, to a user of the computing device 102. As shown in FIG. 1B, the touchscreen display 110 is configured for receiving touch-based user inputs. As an illustrative example, a user interacts with the computing device 102 by touching the touchscreen display 110. The computing device 102 can identify this touch-input and trigger a subsequent presentation of a preview of the video 104, based on contact with its touchscreen display 110. In presenting the preview of the video 104, the user is presented with relevant portions of the video.

The system can create the preview of the video 104 by extracting portions of the longer video. For example, the video may include a collection of frames in a sequential order. The preview of the video 104 may include a subset of frames from the collection of the frames in the video. In some cases, generating the preview of the video 104 further involves the computing device 102 manipulating some attributes of the video. For instance, presenting multiple frames of the preview of the video 104 may be controlled via various user interactions, and thus may not play at the same speed as the longer video. Moreover, the computing device 102 may generate the preview of the video 104 by manipulating the video file (e.g., reduced resolution, decreased frame size), so that the computing device 102 uses fewer resources of the computing device 102 to animate the preview, as compared to playing the video. In some cases, an automated system determines the frames and generates the preview of the video 104, for instance a system associated with an entity involved in creating or distributing the video.

The preview of the video 104 may include a subset of frames that are selected from the collection of frames in the longer video. As an example, the video may include 872 frames, while the preview of the video includes 24 frames from the total. That is, some frames are selected (and others excluded) from the longer video, to generate the preview of the video 104. In some cases, selected frames for the preview may relate to three main portions from the video file, including: 1) frames from a salient clip of the video; 2) frames from a sample of non-adjacent frames from the video; or 3) a subset of frames from the video (that may be adjacent). For purposes of selecting the salient clip and generating the preview of the video 104, the relevant portions of the video may include: 1) portions of the video at which significant motion appears; 2) scenes that are repeated during the video; and 3) portions of the video that are commonly repeated or linked by user input. In some cases, the subset of frames selected for the preview begins with the beginning frame of the longer video, and the other frames are selected in a manner to span the entire video. Thus, in this instance, playing the preview may portray contents from multiple sections of the video. In other cases, the subset of frames for the preview start using a frame that is not the beginning frame of the longer video.

In the case of using a salient clip, the system may determine at least one salient portion from the multiple portions spanning the entire video, and compile a sequence of frames to create a clip for the preview. Further, extracting frames from those aforementioned portions of the longer video to include in the preview may involve: (1) specifying the start time and end time corresponding to the portion and extracting a subset of frames; (2) selecting a specific number of frames (e.g., 24 fps, 10 fps, 5 fps) to extract from the portion, even though there may be more frames in the portion of the video; or (3) selecting each individual frames to be extracted from the portion. In some cases, additional considerations are employed for selecting the frames from the portion of the video to include in the preview. For example, the system may consider characteristics of the frame (e.g., frame size) or the computing device (e.g., resolution of the display), as deemed necessary and appropriate.

Even further, after designating the subset of frames that are included in the preview of the video 104, the system may defined, or otherwise determine, various correspondences between the frames and user interactions. Corresponding the presentation of particular frames to a related interaction, such as scrolling the user interface, allows for the user to progress through multiple frames thereby animating the preview of the video 104.

FIG. 1B illustrates the preview 104 as including a sequential order of frames 120, 121, 122, and 124 from a salient clip of the video, which collectively portray a car chase scene. A salient clip used to compile the frames of the preview of the video 104 may be determined as one or more relevant portions of the video. In continuing with the example, frame 124 of the preview of the video 104 depicts a car crash. Accordingly, frame 124, and other frames surrounding the car crash, may include significant motion and/or spikes in other attributes (e.g., sound, color intensity) which may serve to indicate relevancy of the content depicted by those frames. As a result, the system may extract a certain number of frames relating to the car chase/car crash, as the salient clip for the preview of the video 104.

Moreover, FIG. 1B illustrates the animation of the video, as starting with a first frame 120 that is shown in the touchscreen display 110 of the computing device 102. As shown in FIG. 1B, the user interaction with the touchscreen display 110 of the computing device 102 includes scrolling in a generally upwards direction (represented by the arrow). An initial user interaction, may trigger presenting the animation of the preview of the video. In this example, as the user begins to scroll, the animation is trigged, causing the first frame of the preview of the video 104 to be displayed in the touchscreen display 110. According to the techniques described in the document (relating to FIGS. 4A-4C) the positions in the touchscreen display 110 may correspond to presenting one of the frames in the sequence in the preview, thus allowing the user to control progressing through the frames 121, 122, and 124, effectively animating the preview of the video.

FIG. 1C shows the computing device 102 in the case of receiving an additional user input, which serves as a selection to play the video, for instance, after the user views the preview of the video 104. As illustrated, the second user input may include pressing the portion of the touchscreen display 110 associated with the play button 114 that is presented over the ending frame 124 of the preview. The computing device 192 may then play the video (e.g., starting with the beginning frame of the video), in response to the pressing the play button 114.

According to the disclosed techniques, various user interactions, other than contacting the touchscreen display 110, can cause the computing device 102 to trigger presentation of the preview of the video 104. Other user interactions may include physically moving the computing device 102 (e.g., rotating and translating), and pressing a physical button 112. In some cases, the preview of the video 104 is activated by any one of the mentioned interactions, any interactions not mentioned but deemed suitable for identifying that a user interacted to a presented item, or any combination of thereof.

FIG. 1B depicts a visual input/output mechanism in the form of display 110. The display 110 can take the form of a display with resistive or capacitive touch capabilities, such as a touchscreen. The display 110 is capable of displaying video, graphics, images, and text, and for coordinating user touch input locations with the location of displayed information so that the computing device 102 can associate user contact at a location of a displayed item with the item. The computing device 102 may also take alternative forms, including as a laptop computer, a tablet or slate computer, a personal digital assistant, an embedded system (e.g., a car navigation system), a desktop personal computer, or a computerized workstation.

The computing device 102 can determine a position of physical contact with the touchscreen display 110 (e.g., a position of contact by a finger or a stylus). Using the touchscreen display 110, various "virtual" input mechanisms may be produced, where a user interacts with a graphical user interface element depicted on the touchscreen 110 by contacting the graphical user interface element. An example of a "virtual" input mechanism is a "software keyboard," where a keyboard is displayed on the touchscreen and a user selects keys by pressing a region of the touchscreen display 110 that corresponds to each key.

The computing device 102 can present a graphical user interface (GUI) with the touchscreen display 110. According to the disclosed invention, the GUI can be configured to present an animation of the preview of the video 108 to the user. A graphical user interface is a collection of one or more graphical interface elements and may be static (e.g., the display appears to remain the same over a period of time), or may be dynamic (e.g., the graphical user interface includes graphical interface elements that animate without user input).

Additionally, FIG. 1B illustrates an animation of the preview of the video 108, that includes playing the multiple frames that were designated, or extracted, from the longer video to create the preview of the video 104. In FIG. 1B, the preview of the video 104 is illustrated as a beginning frame in a sequence of the subset of frames to be previewed.

Figure 2:
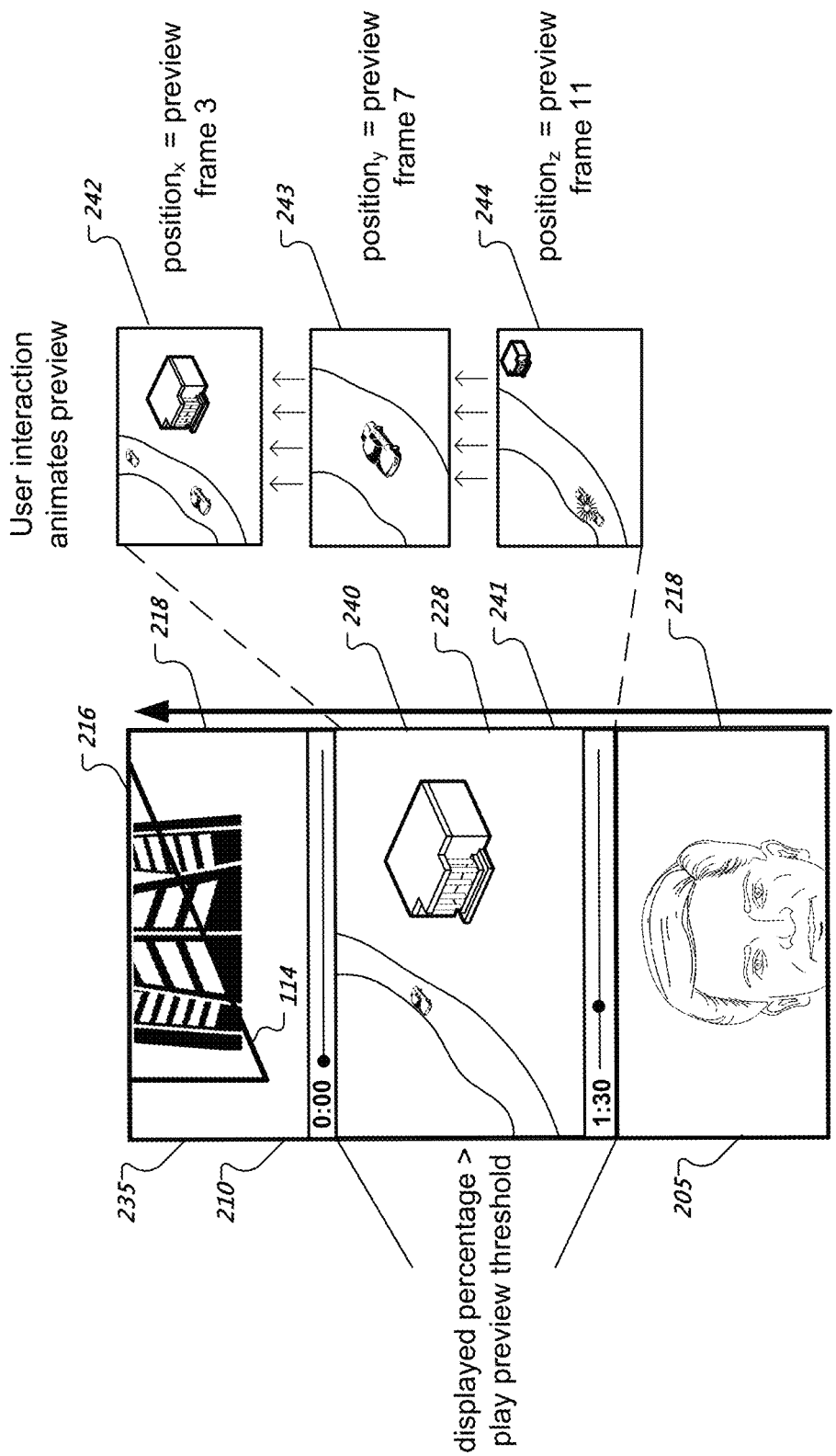
FIG. 2 shows a user interface for animating a preview of a video, in response to a user scrolling a user interface and using the position of frames of the preview of the video in the user interface.
Figure 4A:
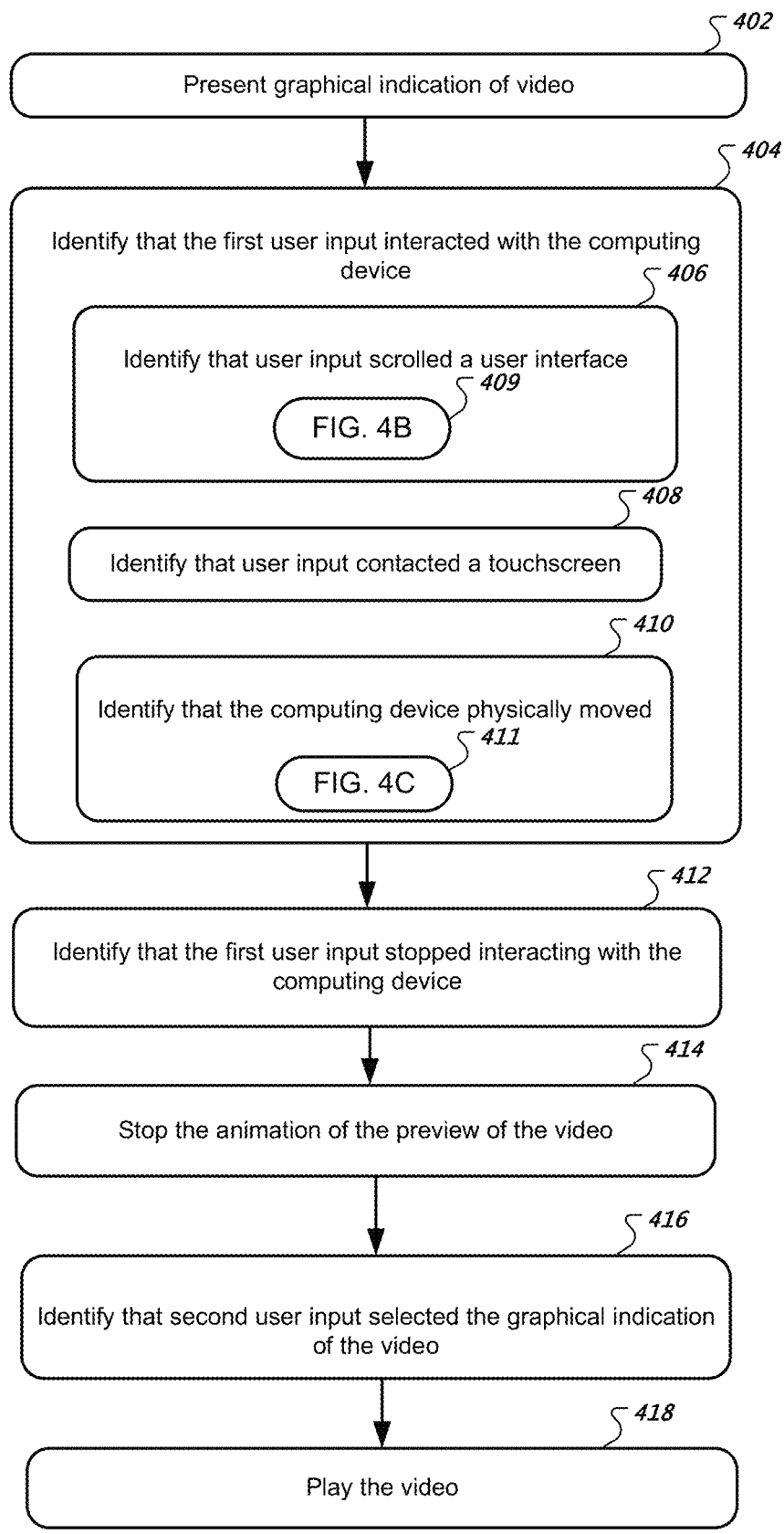
FIG. 4A-C show a flowchart of a process for animating a preview of a video device in response to computing device interaction.
Figure 4B:
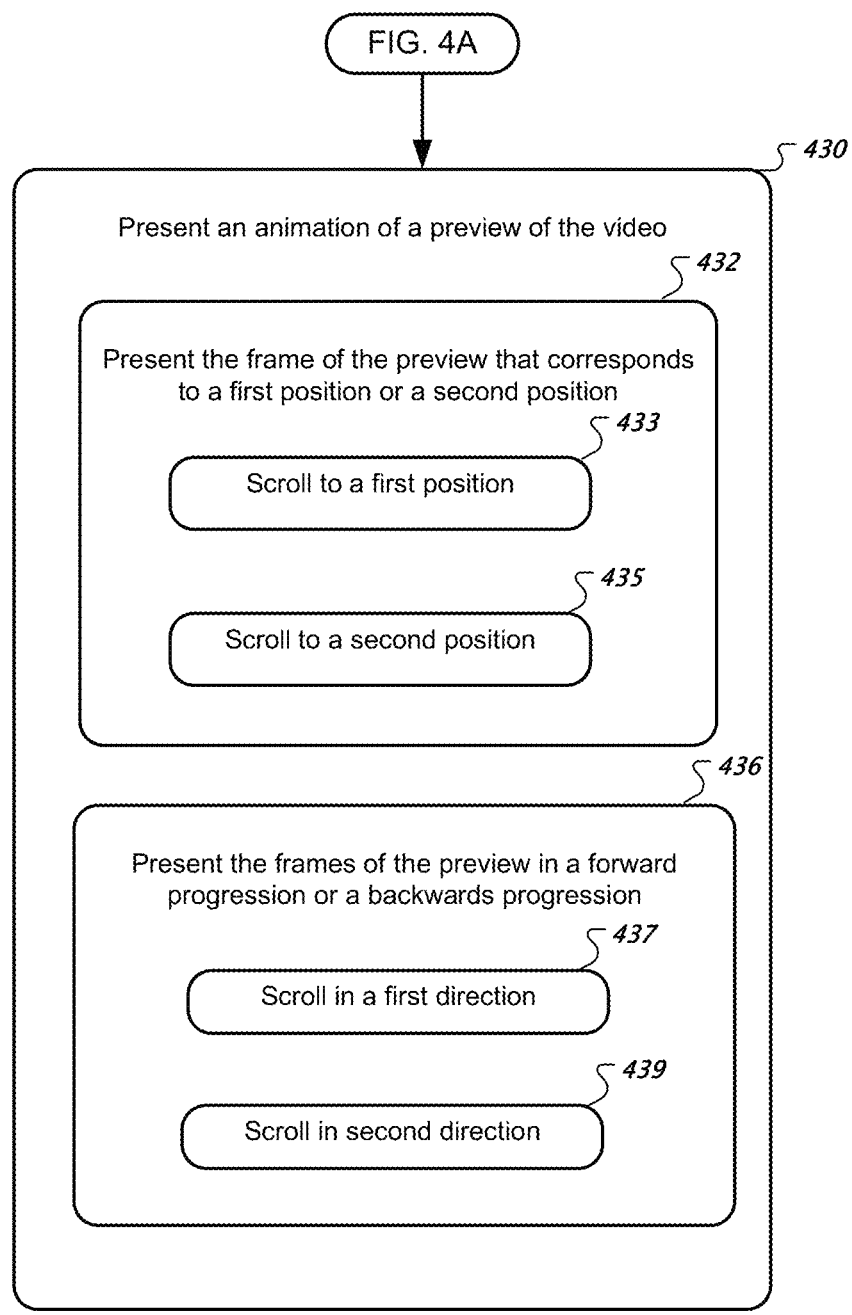
Figure 4C:
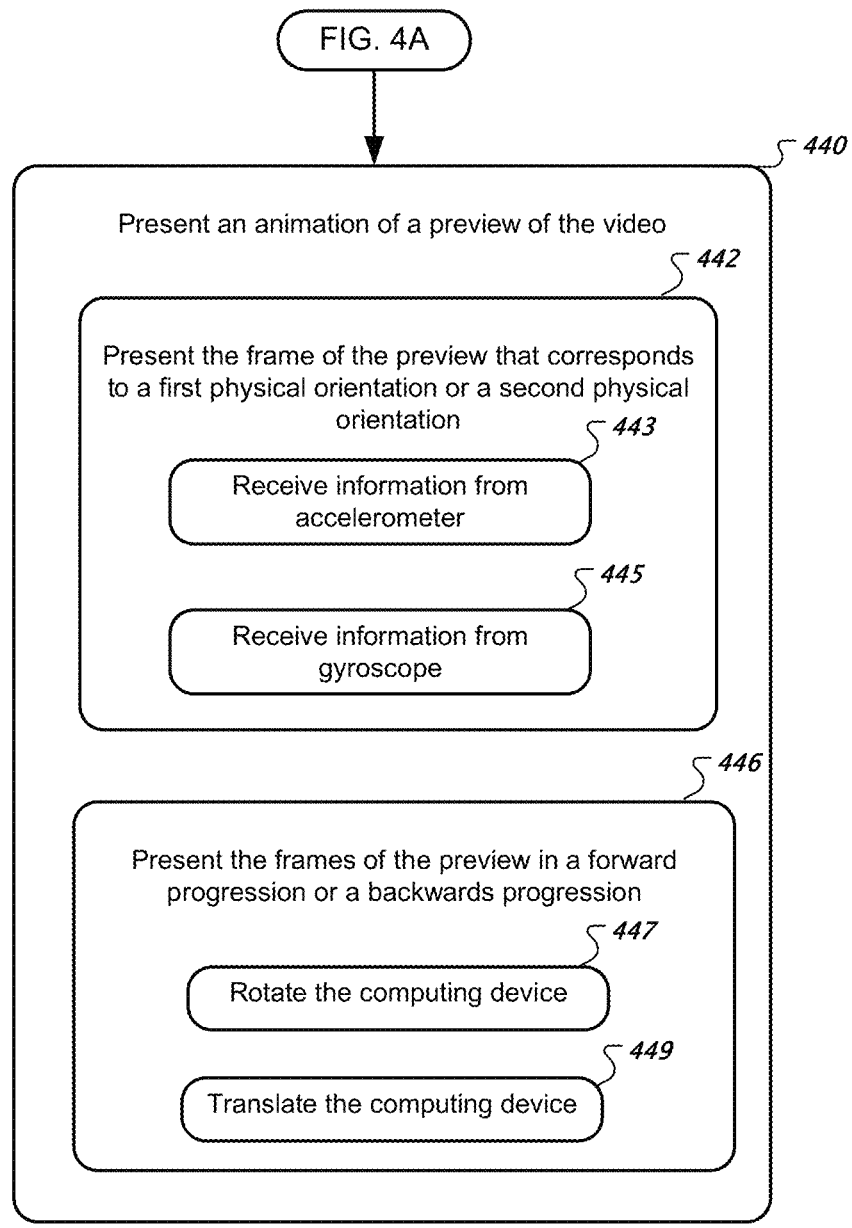

The remaining portions of this document describe the process for animating a preview of a video in response to user interaction with the computing device, and this process is illustrated in the flowcharts FIGS. 4A-C, with references back to FIG. 2 and FIG. 3 to graphically illustrate some of those actions.

At box 402, a computing device presents a graphical indication 116 of a video to the user. As an example, a graphical indication 216 is illustrated in FIG. 2, which notifies a user that the displayed image is related to a video that may require further action to be viewed. Accordingly, presenting the graphical indication 116 of the video can prompt the user to interact with the computing device. The graphical indication 216 is displayed in the user interface 235. The user interface 235 may be the portion of the touchscreen 210 that is controlled by a particular application program and that receives information from a particular third party application to generate the user interface 235 (e.g., a web browser or third-party application program that is downloaded from an application marketplace).

In some cases, the user input directly invokes playing the video (e.g., no preview of the video), for instance, by selecting the play button 214 displayed in the graphical indication 216. In an example, a user sees the graphical indication 216 presented, and may easily recognize the building shown as relating to a popular show, and then presses the play button 214 to watch that show. Here, the user has a clear recognition of their interest in the contents of the video from the user interface 235, and providing a preview of the video was not deemed necessary. User input, however, is restricted to selecting the play button 214. User input to immediately play the video can include selecting any portion of the user interface 218 that corresponds to the graphical indication 214 of the video. Alternatively, the user can interact with the user interface 235 in a manner that does not activate video playback.

At box 404, the computing device can identify that a first user input interacted with the computing device, to trigger presentation of the preview of the video 240. The computing device is capable of identifying, or otherwise determining, one or more selected user inputs relating to a preview of a video 204, based on the mechanism used to receive the input. That is, the computer device can identify the user's interaction with an input component of the device, such as a touchscreen display, physical buttons, a graphical interface, accelerometers, gyroscopes, and the like.

Various types of interactions can be identified by the computer device as a user input that may invoke presentation of the preview of the video 240, such as physically moving the computing device, pressing a physical button of the computing device, or interacting with a touchscreen 210 of the computing device. The interactions can be characterized as gestures that require a measure of deliberate action from the user, which suggests that the user has intentionally acted on the computing device to view a preview of the video 240.

Referring back to FIG. 2, that figure illustrates a user interacting with the computing device by scrolling within the user interface 235, which triggers presentation of a preview of the video 240. As an example, a substantial portion of the front surface of the computing device may implement the touchscreen 210, including the user interface 235. In cases where the user is using the touchscreen 210, the user input can trigger the preview of the video 240 via a multi-touch user input with the touchscreen 210, such as scrolling (box 406); or a single-action user input with the touchscreen 110, such as contacting the touchscreen 110 with a single tap (e.g., box 408).

At box 406, the computing device can identify that a first user input scrolled a user interface. For example, as illustrated in FIG. 2, a user may contact a touchscreen 210 of the computing device, and swipe generally upwards (indicated by the upwards arrow) to move the user interface 235 in the upwards direction. This is illustrated in FIG. 2 by showing the graphical indication 216 as being moved from a centered position in FIG. 1A, to a higher position nearing the upper portion of the user interface 235 in FIG. 2. The movement can occur without the user input being removed from the display. In other words, the user may drag his finger (or a stylus) across the touchscreen 210, before releasing from contact with the display. Although the user input may not be exactly upwards (it may be off by 5 or 10%), the computing device may identify the gesture as being generally upwards and may thus move the user interface 235 in the upwards direction. It should be appreciated that, although scrolling is described in regards to vertical movement (y direction), that scrolling may also involve horizontal movement (x direction), which may also be referred to swiping, for example when the computing device is being used in a landscape physical orientation.

Reference in this document to moving the user interface upwards generally refers to moving items of the user interface (e.g., all items) upwards to correspond to movement on the user input (e.g., moving the same direction and generally the same direction as the user input). Such movement may result in some graphical items near the top of the user interface 235 disappearing from the display during the movement upwards and some graphical items being added near the bottom of the display. Scrolling the user interface 235 is conceptually illustrated in FIG. 2, as scrolling the user interface 235 has caused: the graphical indication 216 to move to the upper edge of the touchscreen 210 in a manner having the upper portion of the building no longer visibly displayed; a first frame of the preview of the video 240 to move from entering into view at the bottom of the touchscreen 210 to being fully displayed in the center of the touchscreen 210; and an additional image 205, shown as a man's face, to appear at the bottom edge of the touchscreen 210. The preview of the video 240, is shown in FIG. 2, as beginning its animation with a first frame 241, which is displayed in the user interface 235. The subsequent frames that are presented during animation of the preview is illustrated as "preview frame 3" 242 which follows the first frame, and two succeeding frames in the subset, "preview frame 7" 243 and "preview frame 111" 243. In the scenario in which the user continues scrolling the user interface 235, at 406, the process proceeds to FIG. 4B.

In FIG. 4B, continuous interaction with the computing device causes the preview to animate. For example, at box 430, the computing device presents an animation of the preview of the video. Referring back to FIG. 2, as the user continues to the scroll the user interface 235 the preview may animate. For instance, the preview of the video 240 (and the other displayed images) may be presented by the graphical interface 235 within an element that is appropriately sized to contain the entire image, hereinafter referred to as a "window". As the user continues to scroll, moving the window up, the movement causes the preview of the video 240 to initially appear in the user interface 235 and move upwards in manner that incrementally increases the amount of the window that is displayed. The preview of the video 240 may animate, upon a certain amount of the preview of the video 240, or the corresponding window, being displayed. In some cases, the preview of the video 240 may animate once a certain number of pixels, or a certain percentage of its size, is displayed in touchscreen 210, or an entirety of the window has moved a certain distance past an edge of the display (e.g., 20 pixels into the middle of the display).

FIG. 2 illustrates a scenario, where animating the preview of the video 240 occurs as the entire first frame (100%) is visibly displayed by the user interface 235. That is to say, the entire height and width of the window for the frame is presented by the user interface 235. However, in some cases, the computing device may use any predetermined percentage threshold that is less than 100%, which upon reaching (or exceeding), triggers animation of the preview of the video 240, for example 75%. Moreover, the computing device can use a predetermined threshold relating to a number of pixels displayed to trigger animation of the preview of the video 240. As an example, the touchscreen 210 may have a size of approximately 5×3 inches, the user interface 235 may present images in a window having a size of 2×2 inches, and the preview of the video 240 may be formatted for display at 440 ppi (pixels per inch). Continuing with the example, the computing device may present the animation of the preview of the video 240 upon determining that 220 pixels of the preview frame (e.g., half of the image displayed by the window) are shown. It should be appreciated that the aforementioned values (e.g., pixels and percentages) are given for purposes of discussion, and any threshold relating to animating the preview can used, as deemed suitable or appropriate to give the video a change to enter the display before it begins playing.

After initialing presenting the animation, which displays a first frame 241 in the subset of frames for the preview to the user, the user may continue scrolling the user interface 235, which may control the animation. The computing device include a timing sequence that maps each frame in the sequence of frames in the preview to corresponding positions within the touchscreen 210. Accordingly, the technology described allows the user's different scrolling gestures to directly manipulate various aspects of animation of the preview of the video 240.

At box 432, the computing device may present the frame of the preview of the video that corresponds to a first position of the display or a second position of the display. For example, in reference to FIG. 2, with continued scrolling, the computing device may successively present the various frames in the preview (as they correspond to the position), thus animating the preview of the video 240. The scrolling movement of the user interface 235 includes a progression in presenting frames that match the sequential order of frames in the preview. As illustrated in FIG. 2, the user scrolling the user interface 235 to a first position, shown as position$_x$, causes a "preview frame 3" 242 to be displayed, which is the next frame following the first frame 241 of the preview of the video 240. Successively displaying the multiple frames (at a substantial speed) may effectuate an animation, or perceived movement, of the images in the preview. That is, as the user continues scrolling upward (represented by arrows between frames), the interface seemingly animates the subsequent frames in sequential order corresponding to the respective position of the user interface 245.

The animation in FIG. 2 illustrates a preview including "preview frame 7" 243 that is presented at a position$_y$, identified by the computing device, and "preview frame 11" 244 that is presented at position$_z$ identified by the computing device. As an example, the first frame 241 of the preview of the video 240 initially shows a single car, which is a beginning frame from a salient video clip portraying a car chase. The remaining frames, namely "preview frame 7" 243 and "preview frame 11" 244, progressively show parts of the car chase scene in the preview which ends in a car crash illustrated by "preview frame 11" 244. For purposes of illustration, the shown number of the frame, for instance "preview frame 7" 243, is not in reference to an numerical position within the subset of frames of the preview, but rather the numerical position within the collection of frames in the video. This is intended to illustrate that presenting the animation of the preview of the video may include playing a subset of frames, which excludes some frames from the sequence of frames in the full video. As an example, FIG. 2 shows the third frame in in the preview (of the video "preview frame 11" 244), even though that frame was an eleventh frame in the video.

In reference back to FIG. 4B, at box 433, the computing device identifies that the user has scrolled the user interface to a first position within the display. The computing device also identifies the particular frame from the preview of the video, which corresponds to the identified first position. In some cases, correspondence between the first position and the frame is relative. In a relative correspondence, all subsequent relationships between positions and frames are based on an initial position of the user interface when the preview starts playing. That is, the first position is identified with respect to the position of the user interface, upon initially triggering presenting the animation of the preview. For instance, the computing device may determine that the first frame reaches the predetermined percentage threshold (e.g., 100%) at an initial position, such as a measured height, in the display (e.g., 2 inches). Thus, the computing device calculates the first scrolling position (corresponding to the next frame in the sequence for the preview of the video) as being a designated distance (e.g., 12.7 millimeters or approximately 0.5 inches) upwards relative to that initial position.

In other cases, the first position is identified using an absolute correspondence between the position of the user interface and the frame. An absolute correspondence may involve correlating a frame to a predefined position in the display (without considering the initial position of the user interface). For example, specifying the first position is located at a substantially exact height (e.g., 2.5 inches) and corresponding that position to a specific frame in the preview. In some cases, the first position is defined as a range, for example a range of within +/−6 mm of a height, or direct position in the display. In some cases, the first position is a distance proportional to the size of the display, or distance moved of graphical elements of the display. Accordingly, the computing device can identify when user interaction involves scrolling the user interface to a portion of the display designated by the system as the first position. Then, the computing device may present the corresponding frame of the preview, as a result of identifying that the user has scrolled to an area considered display as the first position.

Thereafter, at box 435, the computing device can determine that the user has scrolled to a second position, which may correspond to the next frame in the sequence for the preview of the video. Accordingly, the computing device can present the frame of the preview that corresponds to the second position, as a result of having identified that the user interface is scrolled to the second position. It should be appreciated that the computing device may be programmed to allow for any number of positions of a display that may be greater than two, which similarly correspond to a designated frame (e.g., after the second frame) of the preview. Referring to FIG. 2 again, the computing device may identify a third position, shown as position$_z$, which causes presentation of the third frame (e.g., "preview frame 11" 244). A finite number of positions can be selected, which relates a user actively scrolling in the display to the timing at which the frames are presented. The number of scrolling positions that correspond to the frames in the preview may be based on various parameters, such as the size of the screen, the number of frames in frames in the preview, and the like. In some cases, almost each position of the user interface may correspond to a particular frame of in the preview, which may allow for a smooth transition between presenting frames in the preview are played back.

The preview may begin playing when the user interaction begins, and may continue until the user interaction ends (e.g., the animation may occur as long as the user input is contacting the display or moving). Because the user interface may move according to physics modelling that cases the user interface to continue to move up and down after the user releases contact with the display, the progression of the animation (e.g., forwards or backwards) may continue until the user interface stops moving even though the user input may have ended at a previous moment.

In reference to FIG. 4B, at box 436, the computing device may present the frames of the preview in a forward progression or a backwards progression. The progression may include, at box 437, identifying that user interaction includes scrolling the user interface in a first direction. In response to the determination, the computing device may present the frames of the preview in a forward direction. Referring again to FIG. 2, the user interface is shown as being scrolled upward (indicated by the upwards arrow) to animate the preview. In this case, scrolling upwards may be considered the first direction, which causes the forward progression. In continuing to scroll the user interface in the same direction, upwards, it also continues the forward animation. A forward progression through the animation can include presenting the frames of the preview in an increasing sequential order, for instance starting from a beginning frame for the preview and progressing through later frames. It should be appreciated that the identified first direction is not restricted to an absolute correspondence, such as directly linking scrolling upwards to a forward progression. Rather the computing device may apply a relative correspondence between direction and the progression of animating the preview. As an example, the computing device may consider any direction corresponding to the user interaction that initiates presenting the animation of the preview of the video, as the first direction. Thus, continued scrolling in the same direction causes the forward progression through the frames to animate the preview. In this case, the first direction may correspond to other directions such as swiping the user interface left or right, or generally moving the user interface in a downwards direction.

At box 439, the computing device may identify that the user input is scrolling the user interface in a second direction. In some cases, the second direction is considered a direction that is opposite the first direction. For instance, the opposite direction can involve the user interface being moved down versus previously moved up, or moving left versus right. In response to the computing device identifying the second direction, it may present frames of the preview in a backwards progression. As a result, the computing device can present a backwards progression through the animation, which may present the frames of the preview in a decreasing sequential order, such as playing the earlier frames in the preview after a later frame in a manner similar to rewinding a video. FIG. 2 illustrates animating a forward progression of the preview, in response to upwards scrolling. In continuing with the example, the user may change their interaction to scroll in the opposite direction, thereby reversing the movement of the user interface to go downwards. As such, scrolling in the second direction, namely downward, may cause the preview to be animated in the backwards progression. In FIG. 2 a backwards progression may start from the ending car crash frame, "preview frame 11" 244 and play the previous frames in descending order Alternatively, the computing device may sense movement of the user interface in a direction which opposes the direction that triggered presentation of the animation of the preview (i.e., first direction), and may consider that as the second direction. The following portions of the document describe the aspects of presenting the preview of the video relating to physically moving the computing device, such as rotating and translating.

Referring back to FIG. 4A, at box 410, the computing device may identify that the first user input interacted with the computing device by physically moving the device itself. Moving the physical device in a rotating motion may be a single-handed interaction with the device, rather than using both hands to interact with the touchscreen of the computing device. Based on the computing device identifying this physical movement, the process may proceed to FIG. 4C.

In FIG. 4C, a user continuing their interaction with the computing device, namely continuing to move the computing device, causes the previous to animate. In response to the detected movement, at box 440, the computing device may present an animation of a preview of the video.

Animating the preview may involve, at box 442, presenting the frame of the preview that corresponds to a first physical orientation or a second physical orientation. As discussed in reference to FIG. 2B, the computing device may identify a correspondence between the frames of the preview to various positions within the display. Similarly, the computing device may also identify frames of the preview that correspond to respective physical orientations, resulting from physically moving the computing device. Referring to FIG. 3B, the figure illustrates the computing device 302 having a physical orientation that may correspond to presenting a designated frame 340 from the preview.

The computing device 302 may have sensors capable of sensing various movements, allowing the computing device to receive information indicating that the computing device has physically moved, and further to determine the physical orientation of the device resulting from the movement. Accordingly, in some cases, the computing determining may utilize certain sensors to determine how the device is oriented. Again, referencing FIG. 4C, the computing device identifying its physical orientation, or a change in physical orientation, may involve at box 443, receiving information from an accelerometer. Accelerometers are used in some portable computing devices, such as mobile phones, to detect the computing device's physical orientation. An accelerometer may measure an acceleration of translational movement in a direction, such as liner acceleration. Thus, in cases when moving the computing device involves a sliding motion along a straight line, the accelerometer may be employed to detect to the translational movement and communicate the detection information for processing in order to determine physical orientation, for example.

In other cases, determining the physical orientation of the computing device may involve, at box 445, receiving information from a gyroscope. Gyroscopes are used in some portable computing devices to detect rotational movement, for instant relating to rotating or tilting the computing device. Gyroscopes may measure the rate of change associated with movement in a circular motion, such as the angular rotational velocity. Thus, in cases where moving the computing device involves rotating the computing device, the accelerometer may be used to detect to the movement and communicate the detection information for processing in order to determine the physical orientation for the computing device. Physical orientation can also be determined by an accelerometer by detecting the direction in which gravitational forces are acting on the device. Although gyroscopes and accelerometers are discussed, other devices that are capable of detecting orientation and/or movement of the computing device may be employed in addition to, or in place of, the aforementioned sensors, including: digital compasses, magnetometers, barometers, and the like.

Consequently, as a result of having identified the computing device's physical orientation using information from one of the aforementioned sensors, the computing device may identify the frame of the preview that corresponds to that physical orientation. In response to identifying the frame of the preview that corresponds to the physical orientation, the computing device may present that frame.

As discussed above in reference to FIG. 4B, the correspondence between physical orientations and frames may be a relative correspondence, or an absolute correspondence. As an example of the absolute correspondence, the computing device held at a 5° angle, with a respect to a centered axis or zero position for example, may correspond to a particular frame of the preview regardless how the computing device was positioned when playing the preview was triggered. In a relative correspondence, the physical orientation, or angle, of the computing device when the preview started would serve as the "zero" position of the computing device. For instance the zero position may be the computing device orientated at a true zero, or having 0° angle from a center axis (e.g., horizontally flat). As another example, the zero position may be identified after some angular movement of the computing device, for instance having a physical orientation that is 5° from the center axis. Consequently, the computing device may identify subsequent physical orientations with respect to the zero position. Continuing with the examples, a second physical orientation corresponding to a next frame in the preview may be defined as 20° clockwise (positive angular movement) from the zero position. Thus, the computing device may identify the second physical orientation to present that frame at 20° in the first example, and 25° in the other example.

In referring back to FIG. 3B, the computing device 302 may have the illustrated physical orientation, as a result of the user previously moving the device to trigger playing the preview. For instance, the user input may have interacted with the computing device 302 by rotating the computing device 302 in a manner that causes animation of the frames of the preview, starting from the beginning of the preview, and continuing through the sequential order of frames of the preview to reach the currently displayed frame 340. Frame 340 is illustrated as one of the intermediate frames of the car chase scene portrayed by the preview.

In some cases, controlling various other aspects of the animation corresponds to the interactions involving physically moving the computing device. At box 446, the computing device may present the frames of the preview in a forward progression or a backwards progression, in response to moving the devices in different manners. At box 447, physically moving the computing device may involve rotating the computing device. In this case, identifying that the computing device has been moved in a first manner may include rotating the computing device in a first direction. In response, the computing device may present the frames in a forward progression. Thereafter, identifying that the computing device has been moved in a second, or different manner, may include rotating the computing device in a direction that is opposite the first direction. In response, the computing device may present frames of the preview in a backwards progression.

Alternatively, at box 449, physically moving the computing device may involve translating (or sliding) the computing device. In this case, identifying that the computing device has been physically moved in a first manner may include translating the position of the computing device in a certain direction. In response, the computing device may present the frames in a forward progression. Thereafter, identifying that the computing device has been moved in a second, or different manner, may include translating the position of the computing device in a direction that is opposite the first direction. In response, the computing device may present frames of the preview in a backwards progression.

FIGS. 3A-C show the computing device 302 animating a preview of a video in response to a user physically moving the computing device by rotating the computing device. As an example, positive angular movement may cause forward playback of the preview and negative angular movement may cause backwards payback of the preview. FIG. 3A shows the computing device displaying another frame 341 of the preview of the video, which corresponds to another physical orientation. The computing device 302 may be oriented differently than shown in FIG. 3B, as a result of the user physically moving the device during animation of the preview. In FIG. 3A, the computing device 302 may be moved in a first manner of rotating the computing device in negative angular direction (represented by the counterclockwise arrow) with respect to the physical orientation in FIG. 3B. Further, FIG. 3C illustrates a scenario in which the computing device 302 is moved in a second manner of rotating the computing device in positive angular direction (represented by the clockwise arrow) with respect to the physical orientation in FIG. 3B.

Correspondingly, FIG. 3A shows the computing device 302 presenting a frame 341 from the preview, which depicts the first car entering the frame on the road alone. This illustrates rewinding the preview due to moving the device, as frame 341 (shown in FIG. 3A) may be one of the frames that are before frame 340 (shown in FIG. 3B), depicting both cars on the road in the sequence of frames for the preview. Thus, FIG. 3A illustrates that rotating the computing device 302 counterclockwise causes a rewinding, or backward progression through the animation to present an otherwise previous frame in the preview. Alternatively, FIG. 3C shows the computing device 302 presenting frame 342 from the preview, which depicts the last frame in the preview which shows the cars crashing. This illustrates that rotating the computing device 302 clockwise (represented by the clockwise arrow) causes forward progression through the animation to present subsequent frames in the preview. Although FIGS. 3A-C illustrate rotating the computing device 302, other forms of movement may cause previews to play, such as translational movement. Moreover, physical orientations and movements of the computing device may correspond to other characteristics of presenting the animation of the preview. Thus, gestures which move the device may effectuate control of the animation in various ways, such as changing playback speed (e.g., 24 fps, 10 fps, or 5 fps), adjusting frame size, adjusting aspect ratio, and the like.

Referring back to FIG. 4A, the computing device may also identify that that the first user input which triggers the preview involves a single-action input, for example tapping on the computing device display. At box 408, the computing device may identify that the user input contacted the touchscreen. In this case, the user contacting the touchscreen can involve an interaction other than multi-user input, such as scrolling the user interface. The computer device may identify contacting the touchscreen in response to a user tapping or clicking on an image displayed in the display of the computing device. As a result of the contact, the computing device may present the animation of the preview of the video, as discussed in detail in reference to FIGS. 4B-C. In some cases, other forms of interactions with the computing may continue animating the preview, in a manner that allows the preview to play as long as the user is manipulating physical elements of the computing device (e.g., typing, changing the volume, or moving the mouse). The previous portions of the document described aspects of the process related to animating the preview of the video based on user interactions, such as scrolling the user interface and physically moving the computing device. The following description of the process relates to aspects that may occur after the animation.

Again referring to FIG. 4A, the process may proceed to box 412. At box 412, the computing device may identify that the first user input stopped interacting with the computing device. The computer device may identify that the user has ceased interacting with the computing device immediately or after an elapsed time period, in order to stop playing the preview. For example, the computing device may stop playing the preview when a time window (e.g., 0.0.1, 0.3, 0.5, or 1.0 seconds) has elapsed without any additional user input being received. As a result, at box 414, the computing device may stop animating the preview of the video. In some cases, stopping the animation involves automatically presenting the end of the preview, for example "jumping" from the currently displayed frame past any remaining frames of preview to show the last frame in the sequence for the preview. In other cases, the computing device may stop animation at the currently displayed frame of the video, regardless of the frame's ordered position in the preview. Additionally, upon ending the preview, the computing device may again present the graphical indication of the video. According to this scenario, after the user has viewed the preview of the video and assumingly gleaned more information regarding its contents, the graphical indication can prompt the user for additional interaction relating to playback of the entire video.

Thereafter, at box 416, the computing device may identify that a second user input has been received. The second input may include selecting the graphical indication of the video. For example, the user may tap a section of a touchscreen display of the computing device corresponding to a play button.

At box 418, the computing device may then play the video, in response to the second user input. In some cases, playing the video may involve downloading, or other mechanisms relating to retrieving the video in a manner that supports playing the video at the computing device, via one or more output components, for the user. Playing the video may include starting the playing the video with a beginning frame from the collection of frames of the video, and playing the remaining frames in the collection of frames in their sequential order.

Figure 5:
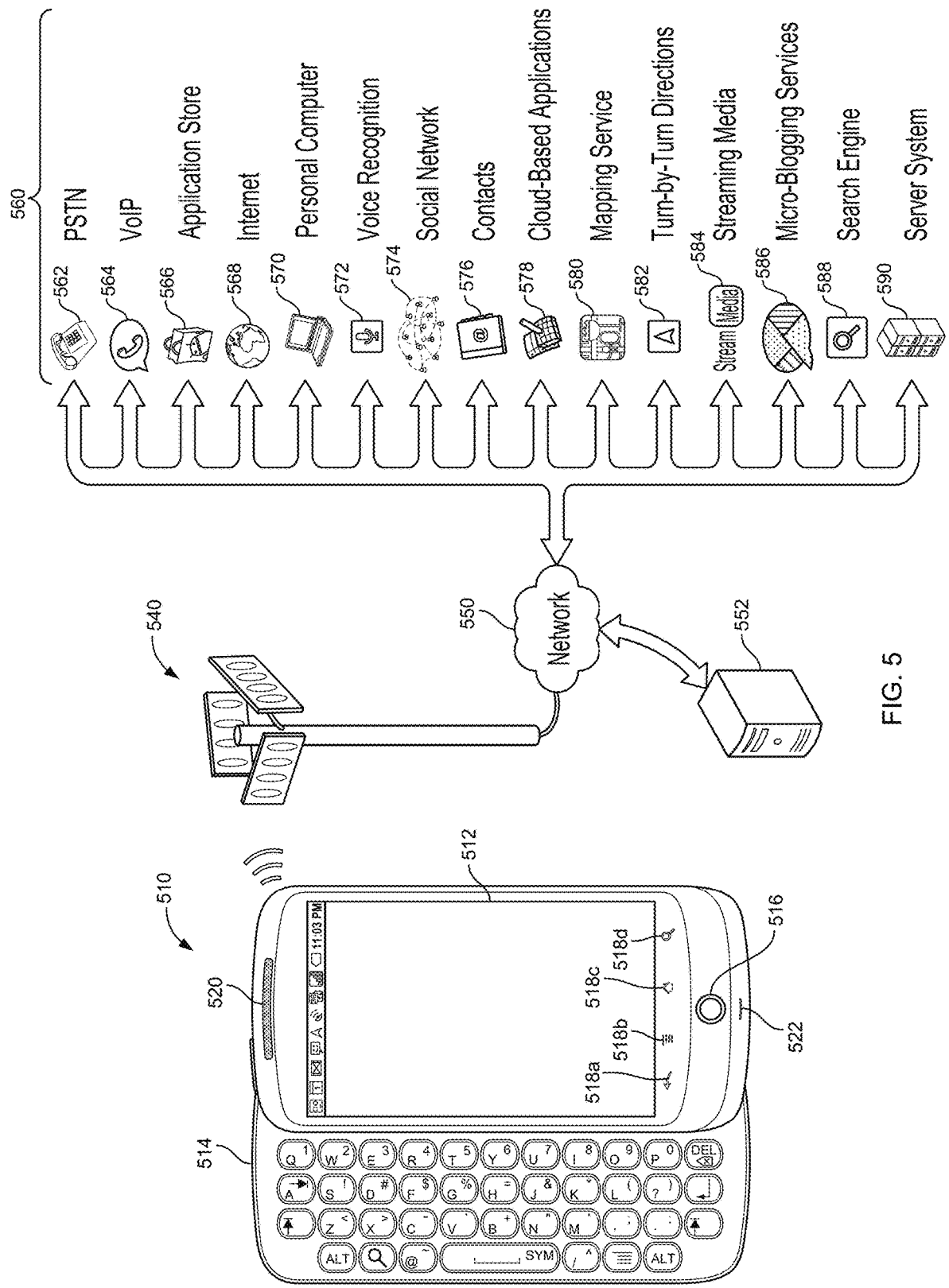
FIG. 5 is a conceptual diagram of a system that may be used to implement the systems and methods described in this document, as either a client or as a server or plurality of servers.

Referring now to FIG. 5, a conceptual diagram of a system that may be used to implement the systems and methods described in this document is illustrated. In the system, mobile computing device 510 can wirelessly communicate with base station 540, which can provide the mobile computing device wireless access to numerous hosted services 560 through a network 550.

In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 514, physical buttons, trackballs, accelerometers, gyroscopes, and magnetometers).

Example visual output mechanism in the form of display device 512 may take the form of a display with resistive or capacitive touch capabilities. The display device may be for displaying video, graphics, images, and text, and for coordinating user touch input locations with the location of displayed information so that the device 510 can associate user contact at a location of a displayed item with the item. The mobile computing device 510 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 514, which may be a full qwerty keyboard or a traditional keypad that includes keys for the digits '0-9', '*', and '#.' The keyboard 514 receives input when a user physically contacts or depresses a keyboard key. User manipulation of a trackball 516 or interaction with a track pad enables the user to supply directional and rate of movement information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518*a-d*. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

In some examples, the operating system provides a "desktop" graphical user interface that is displayed after turning on the mobile computing device 510, after activating the mobile computing device 510 from a sleep state, after "unlocking" the mobile computing device 510, or after receiving user-selection of the "home" button 518*c*. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 510 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 512 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 510 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 510 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 510.

The mobile device 510 may include a digital camera sensor, and corresponding image and video capture and editing software. An internet browser may enable the user to view content from a web page by typing in an addresses corresponding to the web page or selecting a link to the web page.

The mobile computing device 510 may include an antenna to wirelessly communicate information with the base station 540. The base station 540 may be one of many base stations in a collection of base stations (e.g., a mobile telephone cellular network) that enables the mobile computing device 510 to maintain communication with a network 550 as the mobile computing device is geographically moved. The computing device 510 may alternatively or additionally communicate with the network 550 through a Wi-Fi router or a wired connection (e.g., ETHERNET, USB, or FIREWIRE). The computing device 510 may also wirelessly communicate with other computing devices using BLUETOOTH protocols, or may employ an ad-hoc wireless network.

A service provider that operates the network of base stations may connect the mobile computing device 510 to the network 550 to enable communication between the mobile computing device 510 and other computing systems that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing systems associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call using a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

A voice recognition service 572 may receive voice communication data recorded with the mobile computing device's microphone 522, and translate the voice communication into corresponding textual data. In some examples, the translated text is provided to a search engine as a web query, and responsive search engine search results are transmitted to the mobile computing device 510.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program. Example cloud-based application programs include GOOGLE DOCS word processor and spreadsheet service, GOOGLE GMAIL webmail service, and PICASA picture manager.

Mapping service 580 can provide the mobile computing device 510 with street maps, route planning information, and satellite images. An example mapping service is GOOGLE MAPS. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program. Example services that provide streaming media include YOUTUBE and PANDORA.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 6:
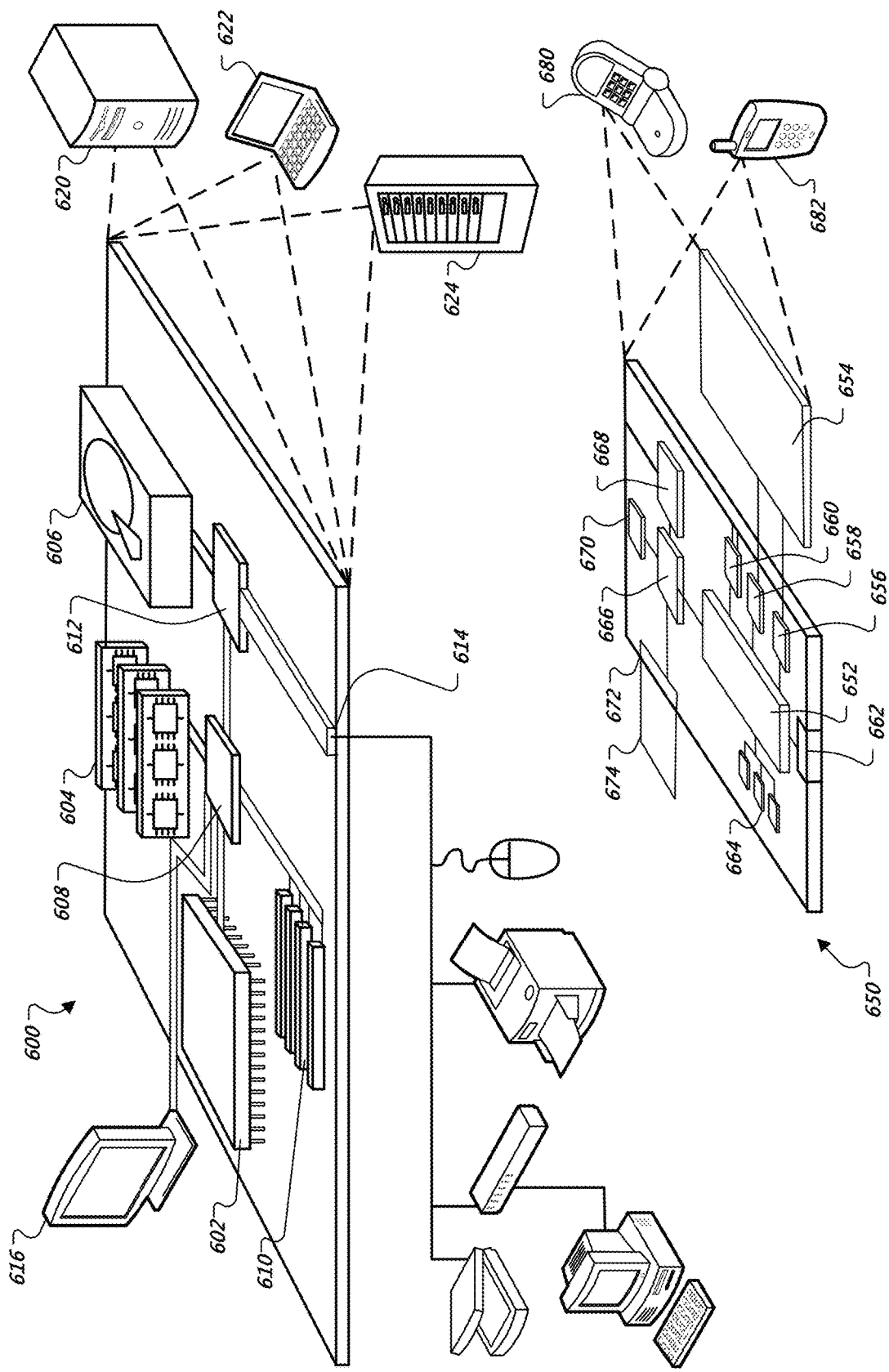
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provided, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
  presenting, on a display of a computing device, a graphical indication of a video;
  identifying, by the computing device, that a first user input scrolled a user interface that is being presented by the display of the computing device;
  presenting, by the computing device, an animation of a preview of the video in response to the computing device having identified that the first user input scrolled the user interface that is being presented by the display of the computing device, wherein the animation of the preview of the video depicts one or more corresponding portions of the video at a first framerate that is different from a second framerate of the one or more corresponding portions of the video, the animation of the preview of the video depicting the one or more corresponding portions of the video at the first framerate that is different from the second framerate due to the animation of the preview of the video being a decimated version of the one or more corresponding portions of the video that excludes regularly-spaced frames from the one or more corresponding portions of the video, wherein presenting the animation of the preview of the video includes:
    (i) identifying that the user interface is scrolled to a first position;
    (ii) identifying a frame of the preview that corresponds to the first position;
    (iii) presenting the frame of the preview that corresponds to the first position as a result of having identified that the user interface is scrolled to the first position;
    (iv) identifying that the computing device is scrolled to a second position;
    (v) identifying a frame of the preview that corresponds to the second position based at least in part on calculating a distance from the first position to the second position; and
    (vi) presenting the frame of the preview that corresponds to the second position as a result of having identified that the user interface is scrolled to the second position;
  identifying, by the computing device, that the first user input stopped scrolling the user interface that is being presented by the display of the computing device;
  stopping, by the computing device, the animation of the preview of the video in response to the computing device having identified that the first user input stopped scrolling the user interface that is being presented by the display of the computing device;
  identifying, by the computing device, that a second user input selected the graphical indication of the video; and
  playing, by the computing device, the video as a result of having identified that the second user input selected the graphical indication of the video.

2. The computer-implemented method of claim 1, wherein the graphical indication of the video includes a play button.

3. The computer-implemented method of claim 2, wherein identifying that the second user input selected the graphical indication of the video includes identifying that the second user input selected the play button.

4. The computer-implemented method of claim 1, wherein:
  the video includes a collection of frames in a sequential order;
  the collection of frames includes a first frame, a second frame, and a third frame, with the second frame occurring in the sequential order between the first and third frame;
  playing the video includes playing the collection of frames in the sequential order;
  the preview of the video includes a subset of frames from the collection of frames;
  the preview of the video excludes intervening frames, such that the preview of the video includes the first frame and the third frame but excludes the second frame; and presenting the animation of the preview of the video includes playing the subset of frames, including the first frame and the third frame, but excluding the second frame.

5. The computer-implemented method of claim 1, wherein:
the video includes a collection of frames;
playing the video includes starting the playing of the video with a beginning frame from the collection of frames;
the preview of the video includes a subset of frames from the collection of frames; and
presenting the animation of the preview of the video includes starting the animation of the preview of the video with a frame that is not the beginning frame from the collection of frames.

6. The computer-implemented method of claim 1, wherein identifying that the first user input scrolled the user interface that is being presented by the display of the computing device includes identifying that user input contacted a touchscreen of the computing device at a location other than the presentation of the graphical indication of the video.

7. The computer-implemented method of claim 1, wherein presenting the animation of the preview of the video includes:
presenting frames of the preview in a forward progression in response to determining that user input is scrolling the user interface in a first direction; and
presenting frames of the preview in a backwards progression in response to determining that user input is scrolling the user interface in a second direction that is opposite the first direction.

8. The computer-implemented method of claim 1, wherein:
the video includes a collection of frames; and
the preview of the video includes a subset of frames from the collection of frames;
the method further comprises selecting the subset of frames from the collection of frames based on a size or resolution of the display of the computing device.

9. The computer-implemented method of claim 1, wherein:
the video comprises a collection of frames; and
the preview of the video includes a subset of frames selected from the collection of frames;
the subset of frames was selected from the collection of frames based on a computer-implemented determination that the subset of frames satisfies a criterion for inclusion in the preview of the video.

10. The computer-implemented method of claim 9, wherein selecting the subset of frames includes:
(i) selecting a user-specified starting time and a user-specified ending time; and
(ii) selecting the subset of frames from times of the video between the user-specified starting time and the user-specified ending time.

11. The computer-implemented method of claim 9, wherein selecting the subset of frames includes:
(i) selecting a number of frames; and
(ii) selecting the subset of frames to include the selected number of frames.

12. The computer-implemented method of claim 1, wherein:
the video includes a collection of frames; and
the preview of the video includes a subset of frames selected from two portions of the video without including frames from a portion of the video between the two salient portions of the video;
the method further comprises selecting the subset of frames based on determining that the subset of frames are from the two salient portions of the video.

13. The computer-implemented method of claim 9, wherein the computer-implemented determination that the subset of frames satisfies the criterion for inclusion in the preview of the video includes determining that the subset of frames represents a most-viewed portion of the video.

14. The computer-implemented method of claim 9, wherein the computer-implemented determination that the subset of frames satisfies the criterion for inclusion in the preview of the video includes determining that the subset of frames represents a portion of the video that has been user repeated or user linked.

15. The computer-implemented method of claim 9, wherein the computer-implemented determination that the subset of frames satisfies the criterion for inclusion in the preview of the video includes determining that the subset of frames represents a portion of the video that depicts content that is repeated within the video.

16. A system, comprising:
one or more processors; and
one or more computer-readable devices including instructions that, when executed by the one or more processors, cause the system to perform operations that comprise:
presenting, on a display of a computing device, a graphical indication of a video;
identifying, by the computing device, that a first user input scrolled a user interface that is being presented by the display of the computing device;
presenting, by the computing device, an animation of a preview of the video in response to the computing device having identified that the first user input scrolled the user interface that is being presented by the display of the computing device, wherein the animation of the preview of the video depicts one or more corresponding portions of the video at a first framerate that is different from a second framerate of the one or more corresponding portions of the video, the animation of the preview of the video depicting the one or more corresponding portions of the video at the first framerate that is different from the second framerate due to the animation of the preview of the video being a decimated version of the one or more corresponding portions of the video that excludes regularly-spaced frames from the one or more corresponding portions of the video,
wherein presenting the animation of the preview of the video includes:
(i) identifying that the user interface is scrolled to a first position;
(ii) identifying a frame of the preview that corresponds to the first position;
(iii) presenting the frame of the preview that corresponds to the first position as a result of having identified that the user interface is scrolled to the first position;
(iv) identifying that the computing device is scrolled to a second position;
(v) identifying a frame of the preview that corresponds to the second position based at least in part on calculating a distance from the first position to the second position; and (vi) presenting the frame of the preview that corresponds to the second position as a result of having identified that the user interface is scrolled to the second position;

identifying, by the computing device, that the first user input stopped scrolling the user interface that is being presented by the display of the computing device;

stopping, by the computing device, the animation of the preview of the video in response to the computing device having identified that the first user input stopped scrolling the user interface that is being presented by the display of the computing device;

identifying, by the computing device, that a second user input selected the graphical indication of the video; and playing, by the computing device, the video as a result of having identified that the second user input selected the graphical indication of the video.

* * * * *